United States Patent [19]

Kedzior

[11] Patent Number: 4,576,300

[45] Date of Patent: Mar. 18, 1986

[54] REUSABLE SHIPPING CONTAINER

[75] Inventor: Edward S. Kedzior, Claremore, Okla.

[73] Assignee: Allegheny Ludlum Steel Corporation, Pittsburgh, Pa.

[21] Appl. No.: 627,377

[22] Filed: Jul. 3, 1984

[51] Int. Cl.<sup>4</sup> ............................................. B65D 9/18
[52] U.S. Cl. ...................................... 217/13; 220/1.5; 220/4 F; 220/83
[58] Field of Search ................ 220/1.5, 4 F, 4 R, 4 C, 220/8, 83, 71, 76; 217/13

[56] References Cited

U.S. PATENT DOCUMENTS

| 3,401,814 | 9/1968 | Chiswell et al. | 220/1.5 X |
| 3,456,830 | 7/1969 | Golder | 220/1.5 |
| 4,050,604 | 9/1977 | Flanders | 220/83 X |
| 4,069,938 | 1/1978 | Palte et al. | 217/13 |
| 4,452,366 | 6/1984 | Nagai et al. | 220/4 F X |

Primary Examiner—Steven M. Pollard
Attorney, Agent, or Firm—Patrick J. Viccaro

[57] ABSTRACT

A reusable shipping container, particularly adapted for the shipment of tubular product. The container has a generally rectangular base that is adapted to support the product during shipment. Generally rectangular side and end panel components are provided and have projecting members that mate with and extend into receptacles provided in the base and top panel components. Likewise, means are provided for connecting in sealing engagement panel components and the base at their adjacent edges. In this manner the container components are reusable and interchangeable.

23 Claims, 7 Drawing Figures

REUSABLE SHIPPING CONTAINER

Metal and alloy tubing, which typically may be made from stainless steel or titanium base alloys, is produced for use in various applications, such as the chemical and dairy industries. This tubing may be of longitudinally welded construction or may be drawn. Because of the varied application during end use of tubing of this type, it is manufactured and shipped in various lengths and various diameters. In addition the configuration of the tubing may be U-bent, wherein the tubing is bent at a generally U-shaped with two relatively long, straight parallel portions. In view of these variations in the product form as well as in the quantity to be shipped containerizing of tubular product of this type is extremely expensive. This results from the fact that the container must be of substantially strong and rigid construction since the tubing is of significant weight. Also, the container must be constructed to withstand the damaging effects encountered during shipping so that the tubing remains protected both against damage from abrasion and the like as well as protection from the elements. Alloys such as stainless steel of various types must be protected particularly against certain media such as chlorides.

Typically shipping containers used for tubular products of this type are specially made for each shipment and are not reusable. Consequently, the cost of shipping container construction adds significantly to the overall cost of products of this type.

It is accordingly a primary object of the present invention to provide a shipping container particularly adapted for the shipment of tubular products that may be reused.

This and other objects of the invention, as well as a more complete understanding thereof, may be obtained from the following description and drawings, in which.

Figure 1:
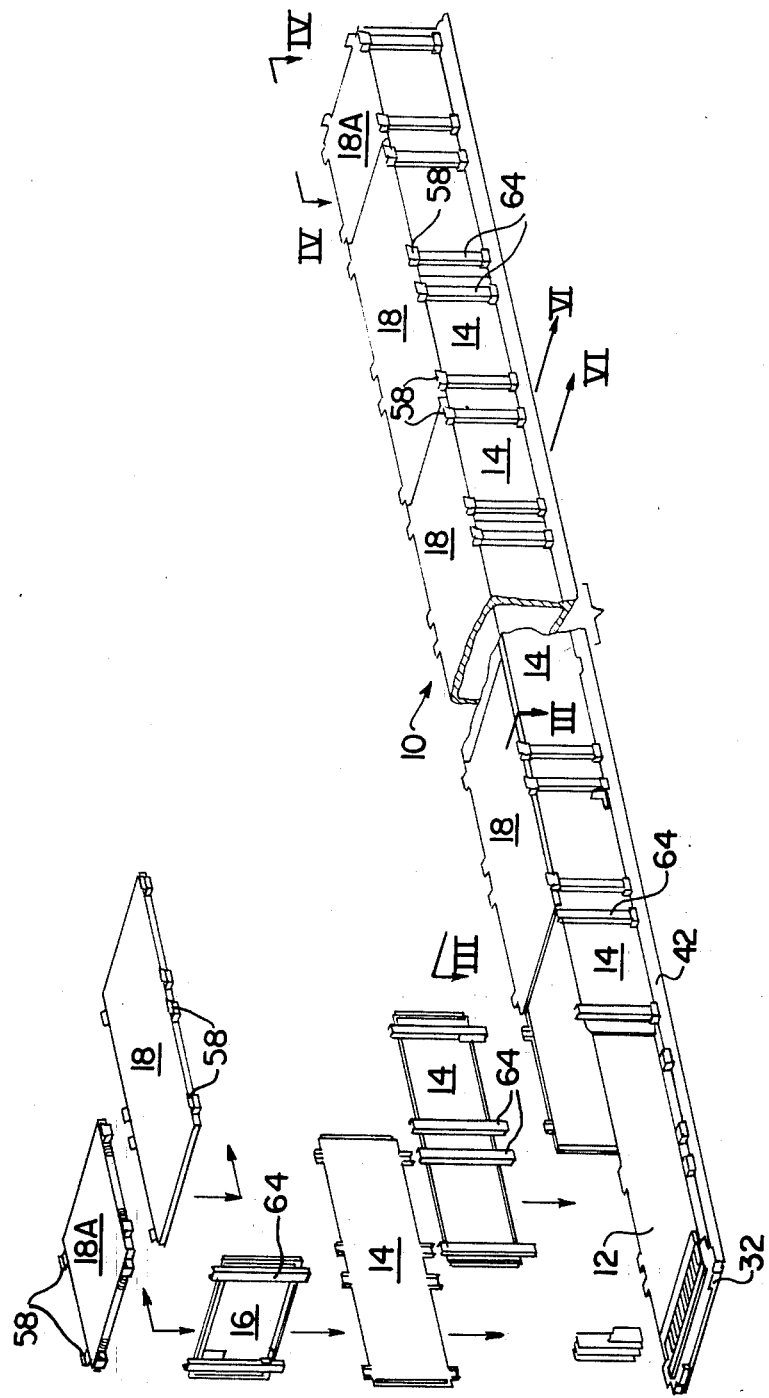
FIG. 1 is a perspective view of one embodiment of a shipping container in accordance with the practice of the invention with parts thereof broken away.

Broadly, the shipping container in accordance with the invention is of generally rectangular cross section. It comprises a generally rectangular base that is adapted to support the tubular product during shipment. Also it comprises generally rectangular side and end components in the form of panels. These components have projecting members that are adapted to mate with and extend into receptacles provided along the edge of the base of the container. In this manner, the side and end components may be removably secured to the base. Likewise, there is a generally rectangular top component that has a plurality of like receptacles. These receptacles are adapted to mate with the projecting members of the side and end components, and these projecting members likewise extend into these receptacles. This provides for removably securing the top member to the sides and end components of the container during assembly thereof for shipment. The projecting members of the side and end components are of metal and of elongated U-shape construction. A portion thereof projects a distance from the edge of these components and it is this portion that extends into the receptacles provided in the generally rectangular base and top components of the container.

The rectangular base of the container has a wooden platform with a peripheral edge member that forms a metal frame. Likewise, the side and end components are of wood construction with the projecting members thereof being made from metal. With respect to the top component it is of wood construction and the receptacles are metal.

The peripheral edge member of the wooden platform has connected thereto an upstanding elongated channel which is adapted to receive therein an edge portion of the side and end components of the container during assembly. Similar structure is provided along the edges of the top components abutting the side and end components to likewise receive an edge portion of the side and end components. Removably securable latching means adapted to latch the side and end components to the top components are provided adjacent abutting edges of the top components with the end and side components. Additional means for securing the side and end components to the base are provided adjacent abutting edges of the side components and the base, preferably in the form of two overlapping tabs; one tab is connected to a side or end component and the other tab is connected to the rectangular base. A fastener, such as a nut and bolt, is in connecting engagement with the tabs.

With this container construction the various components, particularly the end, side and top panels, are all removable. Hence, if a single component becomes damaged it may be removed and replaced so that the remainder of the shipping container may be reused. The length of the container may be varied in accordance with the length of the product to be shipped therein by varying the number of connected side and top panels. Consequently, these components may be reused and interchanged which serves to reduce the overall cost of construction.

Figure 2:
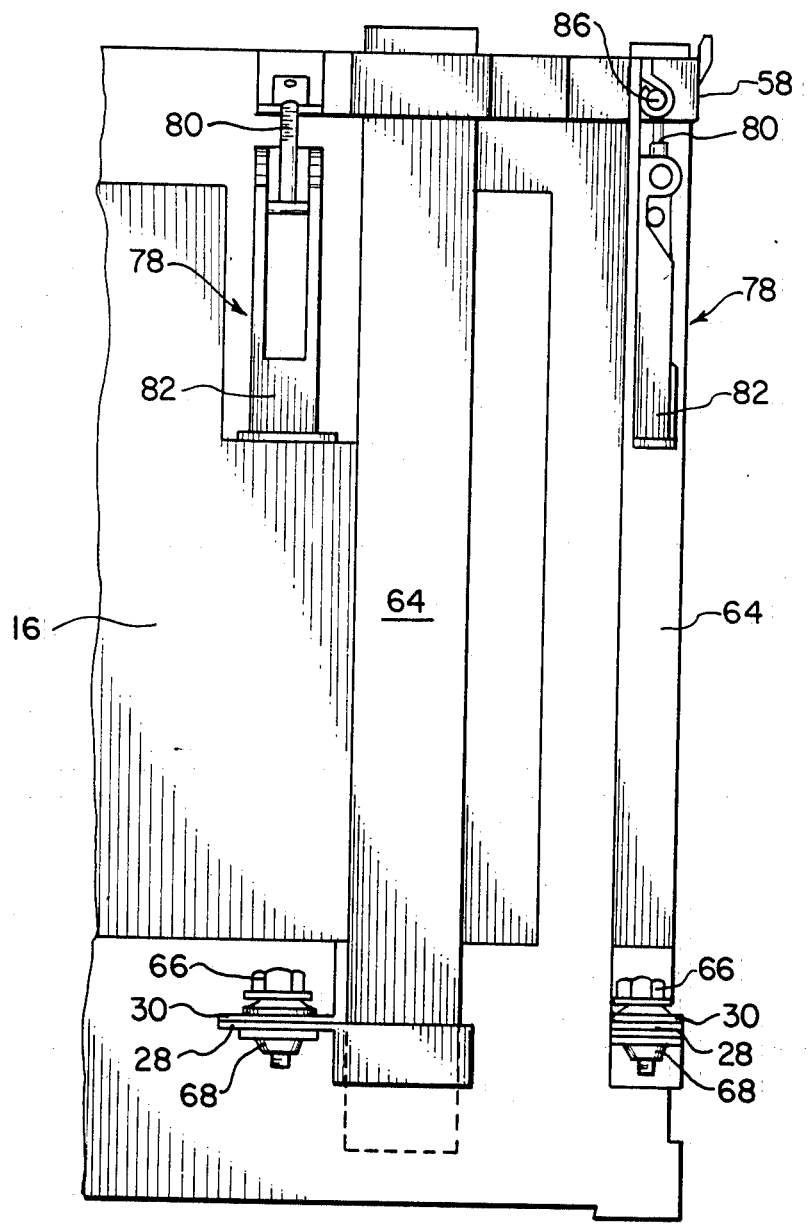
FIG. 2 is an end elevation view of the shipping container of FIG. 1.

With reference to the drawings, and for the present to FIGS. 1 and 2 thereof, there is shown a shipping container in accordance with the present invention, designated generally as 10. The container 10 has a generally rectangular elongated base 12 and a plurality of side panels 14, end panels 16 and top panels 18. The top panels adjacent each end of the container 10 are of shorter length than the remaining panels 18 of the container 10. These end panels are designated as 18A.

Figure 3:
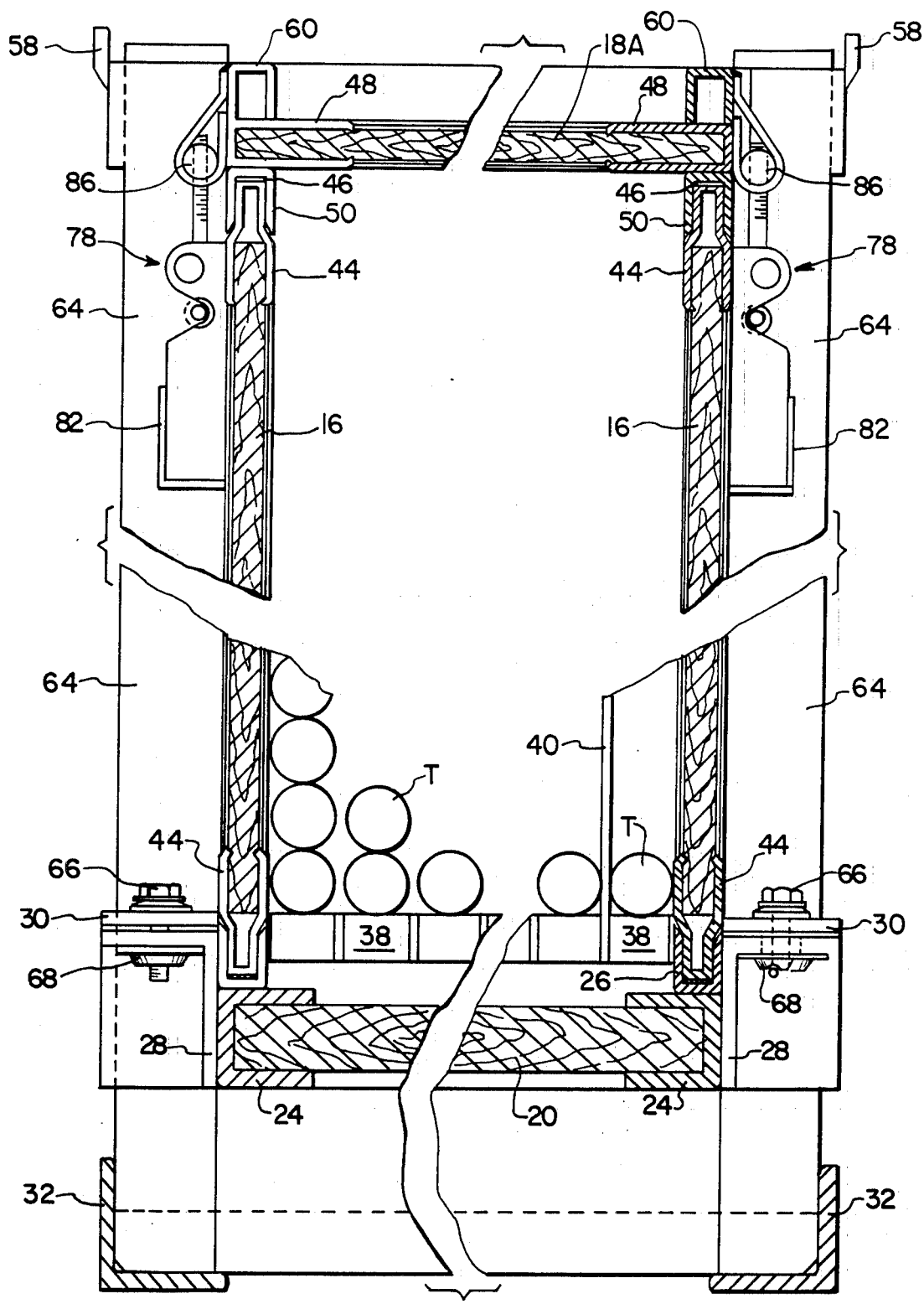
FIG. 3 is a sectional view taken along lines III—III of FIG. 1.
Figure 4:
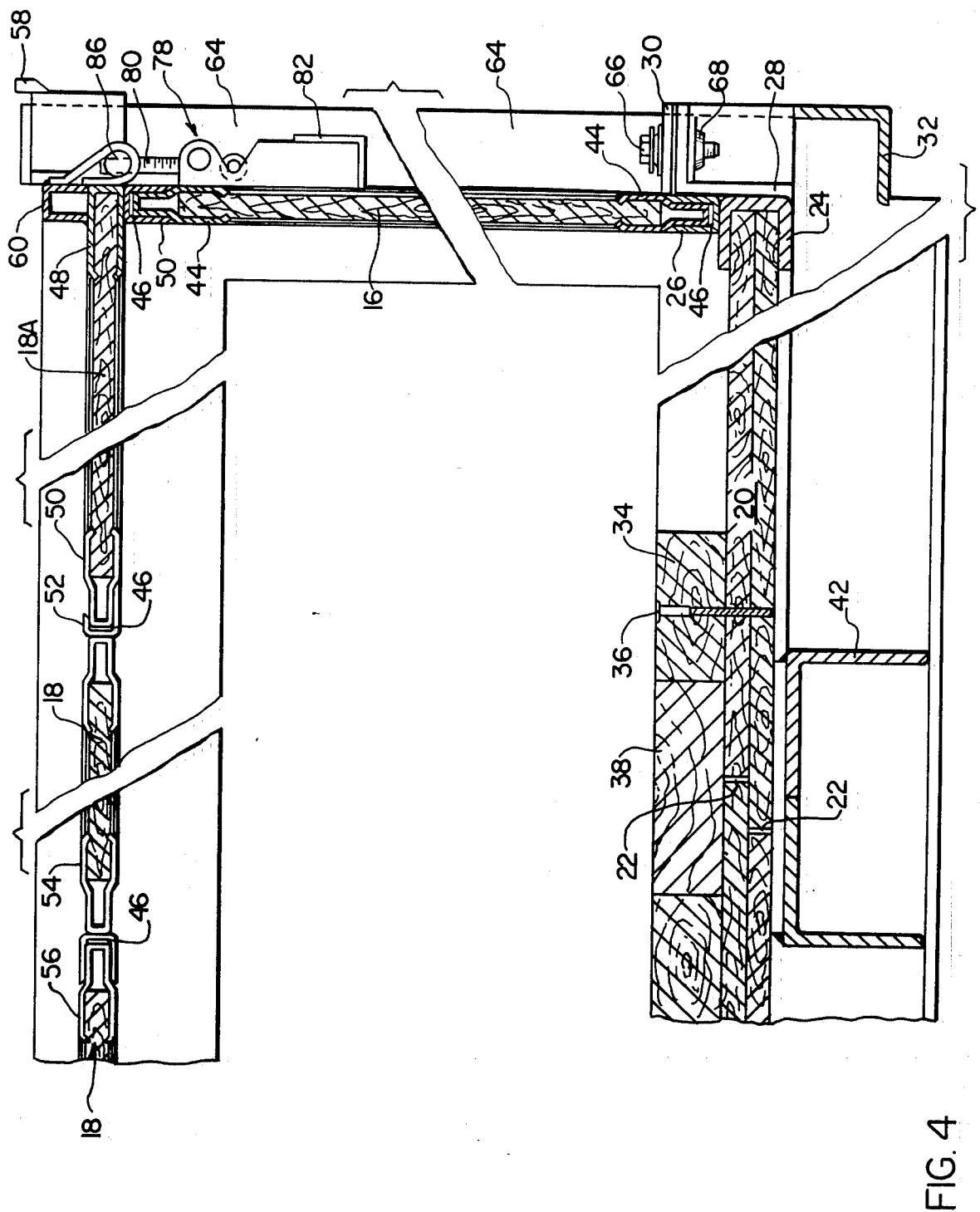
FIG. 4 is a sectional view taken along lines IV—IV of FIG. 1.

As best shown in FIGS. 3 and 4 the base 12 has a wooden rectangular platform 20 which may be constructed from a plurality of plywood sheets having staggered joints designated as 22 in FIG. 4. A metal C-shaped peripheral edge member 24 surrounds the periphery of the rectangular platform 20 with an edge portion of the platform extending into member 24 thereby providing for connection with this component along the edges or periphery of the platform 20. The edge member 24 has connected thereto as by welding a metal upstanding elongated channel 26. The channel 26 extends along the longitudinal edges of the platform 20 which define the sides of the container 10 and to which the panels 14 thereof are connected, as will be later described. Also along these edges of the platform 20 and peripheral member 24 thereof is a series of tabs 28. These tabs 28 are adapted to mate with overlapping tabs 30 provided on side and end panels 14 and 16, respectively. The base 12 further includes an end metal crossbrace 32 that provides end support for the structure. In addition transverse chocks 34 are provided in spaced apart relation on the platform 20. The chocks 34 are wooden, and they are permanently attached to the wooden platform 20 by screws 36 which extend through the chocks 34 and into the platform 20. Wooden longitudinal tube supports 38 are provided between the chocks and these supports are held in place thereby. The tube supports 38, as best shown in FIG. 3, are varied in size in accordance with the size of the tubing, shown and designated as T in FIG. 3. The tubing, as shown in FIG. 3 is stacked on the tube supports 38 and between the supports 38 are provided wooden partitions 40 that separate and prevent the tubes from significant movement during shipment. The bottom of the platform 20 is supported by transverse braces 42.

The side panels 14 are provided with metal top and bottom edge connectors 44 into which an edge portion along both the top and bottom of the panels 14 is inserted for connection. These edge members 44, along the bottom edge of the panel are adapted to slide into the upstanding member 26 of the base 12 to provide for connection of the bottom edge of the panel in removable fashion thereto. A gasket, designated as 46 is provided at the base of the member 44 to aid in sealing the interior of the container against contaminants such as moisture and the like encountered during use of the shipping container. The top panels 18A adjacent the ends of the container 10 have a U-shaped member 48 with an edge connector 50 attached thereto as by welding with the edge connector 50 being adapted to connect with member 44 along the upper edge of the end panel 16 of the container 10. The edge of top panel 18A opposite that connected to the end panel 16 has an additional edge connector 50 that is adapted to project into a generally C-shaped edge member 52 connected to the adjacent edge of top panel 18. The opposite edge of panel 18 is provided with a connector 54 identical to connector 52; the connector 54 is adapted to receive a connector 56 on the edge of adjacent panel 18, which connector 56 is identical to connector 50 of top panel 18A. The edges of the top panels 18 are provided with mating connectors 54 and 56 to provide for removable edge connection of the top panels along the entire length of the container 10. Gaskets 46 are likewise provided at these connectors.

Figure 5:
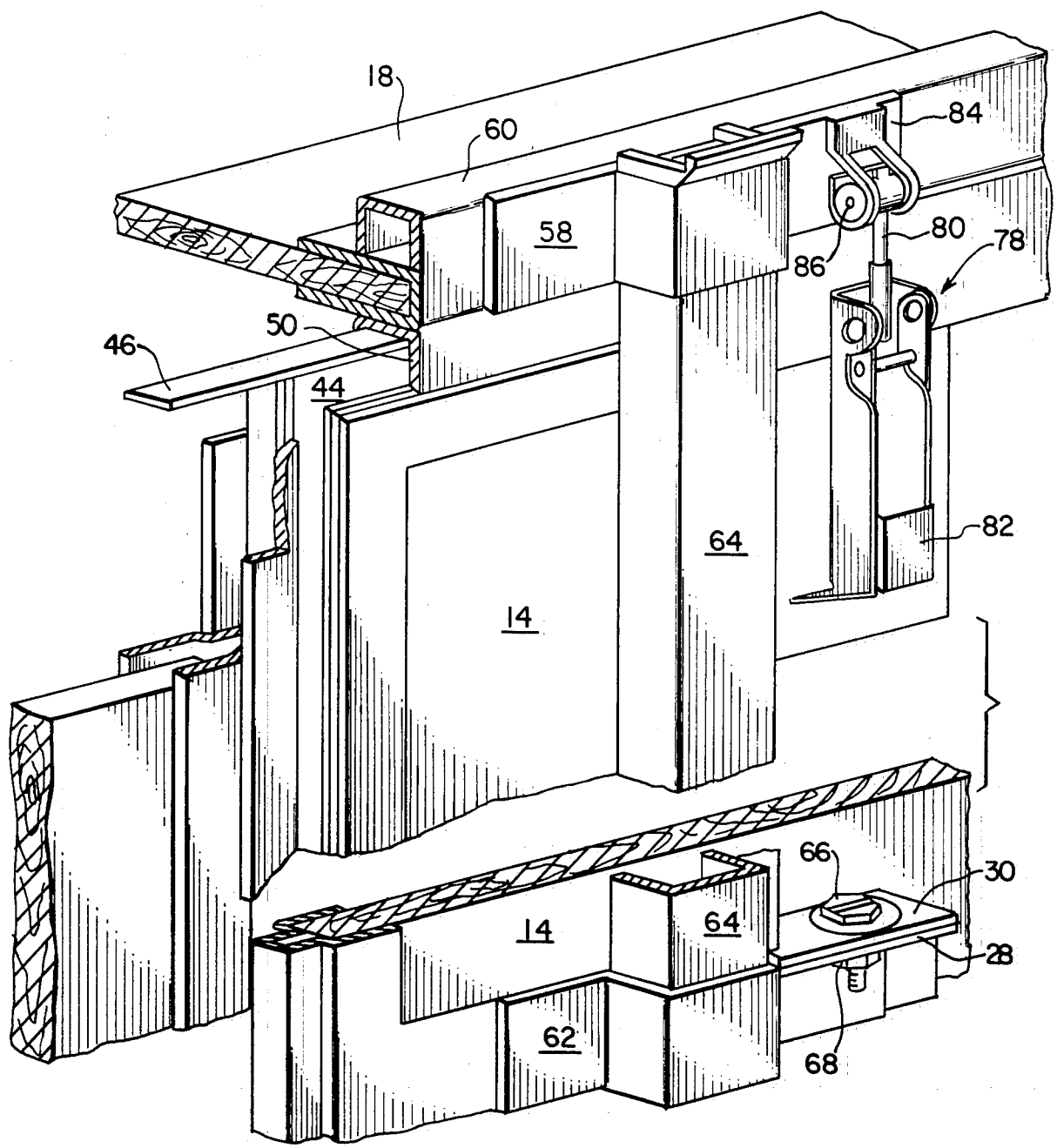
FIG. 5 is a detailed view of a portion of the shipping container.
Figure 6:
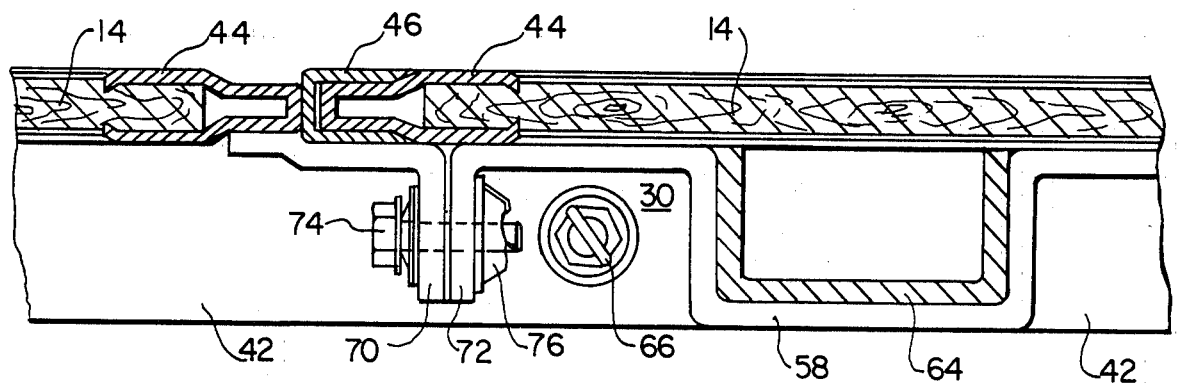
FIG. 6 is a sectional view taken along lines VI—VI of FIG. 1.
Figure 7:
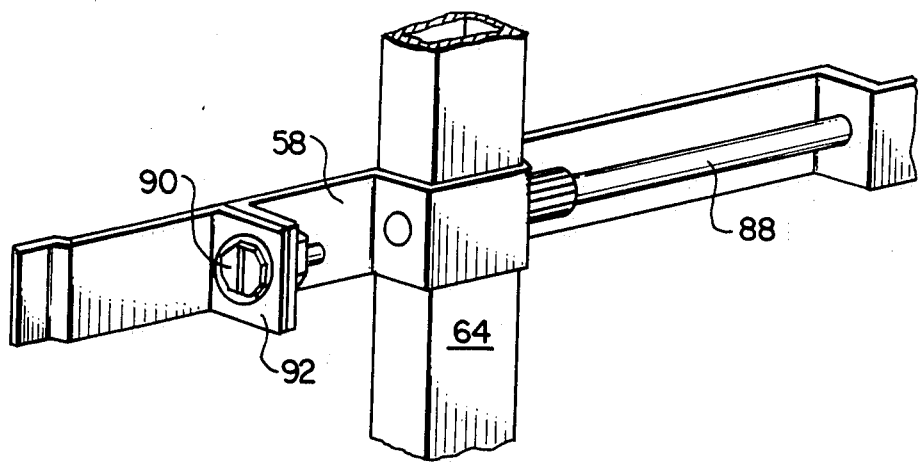
FIG. 7 is a detailed view of a portion of the shipping container.

The side panels 14 are connected to the base 12 and the top panels 18 as best shown in FIG. 5. Connection of the mating edges of the side panels 14 with the top panels 18 is as described with reference to FIG. 4 and the connection of the end panels 16 to the top panels 18 and the base 12. In this regard connection at the edges is provided by the action of the edge connecting components 44 of the side panels 14 with the connecting members 50 of the top panels 18 and 26 of the base 12. Brackets 58 are connected to the top panel 18 at longitudinal cap 60. A similar brace 62 is connected to the base 12 and vertical projecting member 64 on panel 14 slides into both brackets 58 and 62. The member 64 is of rectangular cross section as are the brackets 58 and 60 which accommodate it during connection of the side panel components 14. With the panels 14 and 18 positioned as shown in FIG. 5 a bolt 66 and nut 68 are provided for securing the panels by tightening the nut and bolt through overlapping tabs 28 and 30. In similar fashion the adjacent side panels 14 are pulled together, as best shown in FIG. 6 by overlapping tabs 70 and 72 each of which is connected to adjacent panels 14. A bolt 74 and nut 76 are tightened to secure these tabs thereby drawing the panels together. The projecting member 64 in cooperation with brackets 58 and 62 maintain proper alignment of the panels. As best shown in FIG. 7 the edge connecting members of the panels 14 are identical in construction and function to the edge connecting members of the end panels 16 and are identified with like reference numerals.

The side panels 14 are additionally removably secured to the top panels 18 and 18A by a tension latch designated generally as 78. The device 78 comprises a latching rod 80 which is secured in housing 82. Housing 82 is connected to panel 14. A latching rod receptacle 84 is connected to cap 60 of the top panel. The latching rod 80 is of generally T-shape with the cross-member 86 thereof being held within receptacle 84 for latching engagement.

To facilitate handling of the container 10 incident to loading, unloading and the like, as shown in FIG. 7 a rod shaped handle 88 may be provided. The handle 88 extends between brackets 58 of a top panel. A bolt 90 with associated spacers 92 extends through the bracket 58 projecting member 64 and into the rod shaped handle 88 to secure the same at each end thereof, as shown in FIG. 7. The handles 88 may be provided as convenient along the length of the shipping container 10.

I claim:

1. A reusable shipping container, particularly adapted for the shipment of tubular product, said container comprising a generally rectangular base adapted to support said product during shipment, generally rectangular side components and end components, with said side components being adapted for edge-to-edge, series connection longitudinally along opposite edges of said base, a plurality of exterior receptacles provided in said base whereby said side and top components can be used to vary the length of said shipping container, a plurality of projecting members provided on said side components and said end components, said projecting members being adapted to mate with and extend into said receptacles provided in said base to removably secure said side components and said end components to said base during assembly of said container and generally rectangular top components having a plurality of receptacles, said projecting members being adapted to mate with said receptacles of said top components to removably secure said components and said end components to said top components during assembly of said container in edge-to-edge, series connection longitudinally relative to said base.

2. The container of claim 1 wherein said projecting members provided on said side components and said end components are metal and of elongated U-shaped construction, said projecting members have a portion thereof projecting a distance from an edge of said components and said end components and adapted to extend into said receptacles provided in said bas and said top components during assemby of said container.

3. The container of claim 2 wherein said receptacles of said base and said top components are of generally rectangular configuration and said projecting members are adapted to slide into said receptacles during assembly of said container.

4. The container of claim 3 wherein said base includes a substantially flat rectangular platform, a C-shaped peripheral edge member into which an edge portion of said platform is inserted, with said edge member having an upstanding elongated channel connected thereto, said channel being adapted to receive therein a bottom edge portion of a side component during assembly of said container.

5. The container of claim 4 wherein said channel is adapted to receive therein a bottom edge portion of an end component during assembly of said container.

6. The container of claim 5 wherein removably securable latching means adapted to latch said side components to said top components are provided adjacent abutting edges of said top and side components.

7. The container of claim 6 wherein exterior removably securable latching means adapted to latch said end component to said top components are provided adjacent abutting edges of said top and end components.

8. The container of claim 7 wherein said base additionally includes a plurality of transverse supports beneath said rectangular platform, said transverse supports being spaced apart longitudinally and in supporting engagement with said platform.

9. The container of claim 8 wherein said base additionally includes a plurality of longitudinal tube supports, said tube supports being spaced apart and held in place by a plurality of transverse chocks, said chocks resting on and being secured to said rectangular platform.

10. The container of claim 9 wherein said rectangular platform, tube supports and transverse chocks are of wood construction.

11. The container of claim 10 wherein said transverse chocks are permanently secured to said rectangular platform.

12. The container of claim 11 wherein said transverse chocks are permanently secured to said rectangular platform by a fastener that extends into said chock and said platform.

13. The container of claim 12 wherein means are provided adjacent abutting edges of said side components and said rectangular base for removably securing said side components to said base.

14. The container of claim 13 wherein said means for removably securing said side components to said base comprises two overlapping tabs, one said tab being connected to said side component and said other tab being connected to said rectangular base and a fastener in connecting engagement with said tabs.

15. The container of claim 13 wherein means are provided adjacent abutting edges of said end components and said rectangular base for removably securing said end components to said base.

16. The container of claim 15 wherein said means for removably securing said end components to said rectangular base comprises two overlapping tabs, one said tab being connected to said end component and said other tab being connected to said rectangular base and a fastener in connecting engagement with said tabs.

17. A reusable shipping container, particularly adapted for the shipment of tubular product, said container comprising a generally rectangular base adapted to support said product during shipment, generally rectangular side components and end components, with said side components being adapted for edge-to-edge, series connection longitudinally along opposite edges of said base, said rectangular base including a substantially flat rectangular platform, a C-shaped peripheral edge member into which an edge portion of said platform is inserted, with said edge member haivng an upstanding elongated channel connected thereto, said channel being adapted to receive therein an edge portion of said side components and an edge portion of said end components, projecting members provided on said side components and said end components, said projecting members being of metal, elongated U-shaped construction and having a portion projecting a distance from an edge of said side components and said end components and adapted to enter into a plurality of exterior receptacles provided in said base whereby said side and top components can be used to vary the length of said shipping container and in generally rectangular top components of said container during assembly thereof, said top components being in edge-to-edge, series connection longitudinally relative to said base.

18. The container of claim 17 wherein said base additionally includes a plurality of transverse supports beneath said rectangular platform, said transverse supports being spaced apart longitudinally and in supporting engagement with said platform.

19. The container of claim 18 wherein said base additionally includes a plurality of longitudinal tube supports, said tube supports being spaced apart and held in place by a plurality of transverse chocks, said chocks resting on and being secured to said rectangular platform.

20. The container of claim 19 wherein said rectangular platform, tube supports and transverse chocks are of wood construction.

21. The container of claim 20 wherein said transverse chocks are permanently secured to said rectangular platform by a fastener that extends into said chock and said platform.

22. The container of claim 19 wherein means are provided adjacent abutting edges of said side components and said rectangular base, and said end components and said rectangular base for removably securing said side components and said end components to said base.

23. The container of claim 22 wherein said means for removably securing said side components and said end components to said base comprises two overlapping tabs, one said tab being connected to said component and said other tab being connected to said rectangular base and a fastener in connecting engagement with said tabs.

* * * * *